US011285411B2

(12) United States Patent
Burgan et al.

(10) Patent No.: US 11,285,411 B2
(45) Date of Patent: Mar. 29, 2022

(54) SELF-ADJUSTING AIR MANAGEMENT VALVE FOR A FILTER ASSEMBLY

(71) Applicant: CUMMINS FILTRATION IP, INC., Columbus, IN (US)

(72) Inventors: Eric R. Burgan, Baxter, TN (US); Paul A. Hayes, Columbus, IN (US); Braxton M. Burgan, Baxter, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 296 days.

(21) Appl. No.: 16/305,005

(22) PCT Filed: Jun. 2, 2016

(86) PCT No.: PCT/US2016/035477
§ 371 (c)(1),
(2) Date: Nov. 27, 2018

(87) PCT Pub. No.: WO2017/213618
PCT Pub. Date: Dec. 14, 2017

(65) Prior Publication Data
US 2019/0209951 A1 Jul. 11, 2019

(51) Int. Cl.
*B01D 35/153* (2006.01)
*B01D 36/00* (2006.01)
(Continued)

(52) U.S. Cl.
CPC .......... *B01D 35/153* (2013.01); *B01D 35/14* (2013.01); *B01D 36/001* (2013.01); *F02M 37/32* (2019.01);
(Continued)

(58) Field of Classification Search
CPC ...... B01D 35/153; B01D 35/14; B01D 35/01; B01D 35/30; B01D 35/005; B01D 36/001;
(Continued)

(56) References Cited

U.S. PATENT DOCUMENTS

| 5,746,184 A | 5/1998 | Ekstam |
| 7,572,306 B2 | 8/2009 | Hawkins et al. |

(Continued)

OTHER PUBLICATIONS

International Search Report and Written Opinion issued for PCT/US2016/035477, dated Jun. 8, 2017, 16 pages.

*Primary Examiner* — Akash K Varma
(74) *Attorney, Agent, or Firm* — Foley & Lardner LLP

(57) ABSTRACT

An air management device for a filter assembly includes a top portion, a bottom portion, a plurality of frame members that connect the top portion to the bottom portion so as to define an inner cavity, and an air management valve. The air management valve includes a base portion, an intake valve, and an exhaust valve. The base portion is provided at the bottom portion. The intake valve extends into the inner cavity from the base portion towards the top portion. The intake valve includes an elongated opening that extends along a longitudinal length of the in-take valve. The exhaust valve extends into the inner cavity from the base portion towards the top portion. The intake valve is configured to intake air through the elongated opening and the amount of air introduced through the elongated opening varies based on a fluid level present within the air management device.

17 Claims, 4 Drawing Sheets

(51) Int. Cl.
*F02M 37/22* (2019.01)
*B01D 35/14* (2006.01)
*F02M 37/32* (2019.01)
*F02M 37/54* (2019.01)

(52) U.S. Cl.
CPC ....... *F02M 37/54* (2019.01); *B01D 2201/295* (2013.01); *B01D 2201/4046* (2013.01)

(58) Field of Classification Search
CPC .................. B01D 36/00; B01D 36/003; B01D 2201/295; B01D 2201/4046; B01D 29/50; B01D 46/42; F02M 37/32; F02M 37/54; F02M 37/22; F02M 37/00; F02M 35/0218; F02M 35/10281; F02M 33/00; B60K 2015/03236
USPC .............................................. 210/136, 416.4
See application file for complete search history.

(56) References Cited

U.S. PATENT DOCUMENTS

| | | |
|---|---|---|
| 7,717,092 B2 | 5/2010 | Wieczorek |
| 8,114,278 B2 | 2/2012 | Lorente et al. |
| 8,574,430 B2 | 11/2013 | Chajec |
| 2006/0053756 A1* | 3/2006 | Hawkins ............. B01D 36/001 55/310 |
| 2009/0114589 A1* | 5/2009 | Reiland ................ B01D 29/232 210/472 |
| 2012/0168359 A1 | 7/2012 | Marshall et al. |

* cited by examiner

SELF-ADJUSTING AIR MANAGEMENT VALVE FOR A FILTER ASSEMBLY

CROSS-REFERENCE TO RELATED APPLICATIONS

The present application is a National Stage of PCT Application No. PCT/US2016/035477, filed Jun. 2, 2016, the contents of which are incorporated herein by reference in their entirety.

TECHNICAL FIELD

The present application relates generally to fluid filtration systems. More particularly, the present application relates to fuel filter assemblies.

BACKGROUND

In motor vehicles, fuel filters are typically provided to clean fuel before the fuel is introduced into the engine to increase performance and extend the life of the engine. In some cases, an air management device may be provided within a filter element or cartridge to extract or manage the amount of air present within the fuel filter. In some applications, such as diesel engine applications, the air management device may also serve to mix metered air into the fuel before introduction into the engine for optimal combustion.

Some air management devices incorporate the use of a passive air management valve, which may include a fixed diameter orifice provided at an end of a tube or conduit that extends into the filter element. Air present within the filter element is drawn into the air management valve through the orifice and reintroduced into the fuel flowing through the filter element. In other cases, the air management device may include an active air management valve, such as a manual or automatic control valve, which can be opened or closed to provide metered air into the filtered fuel.

In addition, in certain applications, a fuel pump, such as an electric fuel pump, may be provided to actively pump fuel from the fuel tank to the engine. Fuel filters may then be positioned upstream of the fuel pump (suction-side type) and/or downstream of the fuel pump (pressure-side type) to clean the fuel before introduction into the engine.

In the case of suction-side type filters, the fuel is pulled through the filter by the suction force of the fuel pump. This vacuum pressure may result in air being drawn into the air management device in large, gulp-like quantities such that large air bubbles are formed when reintroduced into the fuel. These large bubbles, when introduced into the fuel pump, may contribute to cavitation within the fuel pump, which may lead to undesirable noise during operation of the fuel pump. To reduce noise produced by the fuel pump, one method has been to add a form of noise isolation to the fuel pump, such as rubber mounts, insulation, or the like.

SUMMARY

A first set of embodiments provide for an air management device for a filter assembly. The air management device includes a top portion, a bottom portion, a plurality of frame members that extend longitudinally and connect the top portion to the bottom portion so as to define an inner cavity, and an air management valve. The air management valve includes a base portion, an intake valve, and an exhaust valve. The base portion is provided at the bottom portion. The intake valve extends into the inner cavity from the base portion towards the top portion. The intake valve includes an elongated opening that extends along a longitudinal length of the intake valve. The exhaust valve extends into the inner cavity from the base portion towards the top portion. The intake valve is configured to intake air through the elongated opening and the amount of air introduced through the elongated opening varies based on a fluid level present within the air management device.

A second set of embodiments provide for a filter element. The filter element includes a filter media having a first end and a second end and defining an inner annulus, a first end cap attached to the first end of the filter media, and an air management device disposed within the inner annulus. The air management device includes a top portion disposed at the first end of the filter media, a bottom portion disposed at the second end of the filter media, and an air management valve. The air management includes a base portion, an intake valve, and an exhaust valve. The base portion is provided at the bottom portion. The intake valve extends from the base portion towards the top portion. The intake valve includes an elongated opening that extends along a length of the intake valve. The exhaust valve extends from the base portion towards the top portion. The intake valve is configured to intake air through the elongated opening, and the amount of air introduced through the elongated opening varies based on a fluid level present within the filter element.

A third set of embodiments provide for a filter assembly. The filter assembly includes a housing that defines a hollow interior space and a lid removably attached to the housing. The lid has a fluid inlet that receives fluid to be filtered and a fluid outlet that allows filtered fluid to exit the filter assembly. A filter element is disposed in the hollow interior space. The filter element includes a filter media having a first end and a second end and defines an inner annulus. A first end cap is attached to the first end of the filter media. An air management device is disposed within the inner annulus of the filter media. The air management device includes a top portion disposed at the first end of the filter media, a bottom portion disposed at the second end of the filter media, and an air management valve. The air management valve includes a base portion, an intake valve, and an exhaust valve. The base portion is provided at the bottom portion. The intake valve extends from the base portion towards the top portion. The intake valve includes an elongated opening that extends along a length of the intake valve. The exhaust valve extends from the base portion towards the top portion. The intake valve is configured to intake air through the elongated opening, and the amount of air introduced through the elongated opening varies based on a fluid level present within the filter element.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various example embodiments provide for a filter assembly having a self-adjusting air management device that can automatically manage and adjust the amount of air introduced into a fluid or liquid that is being filtered through the filter assembly based on a fluid or liquid level present within the filter assembly. In particular embodiments, the self-adjusting air management device can passively extract air present within the filter assembly so as to provide adjustable amounts of metered air into the filtered fuel and to reduce the risk of undesirable noise in a downstream fuel pump.

Figure 1:
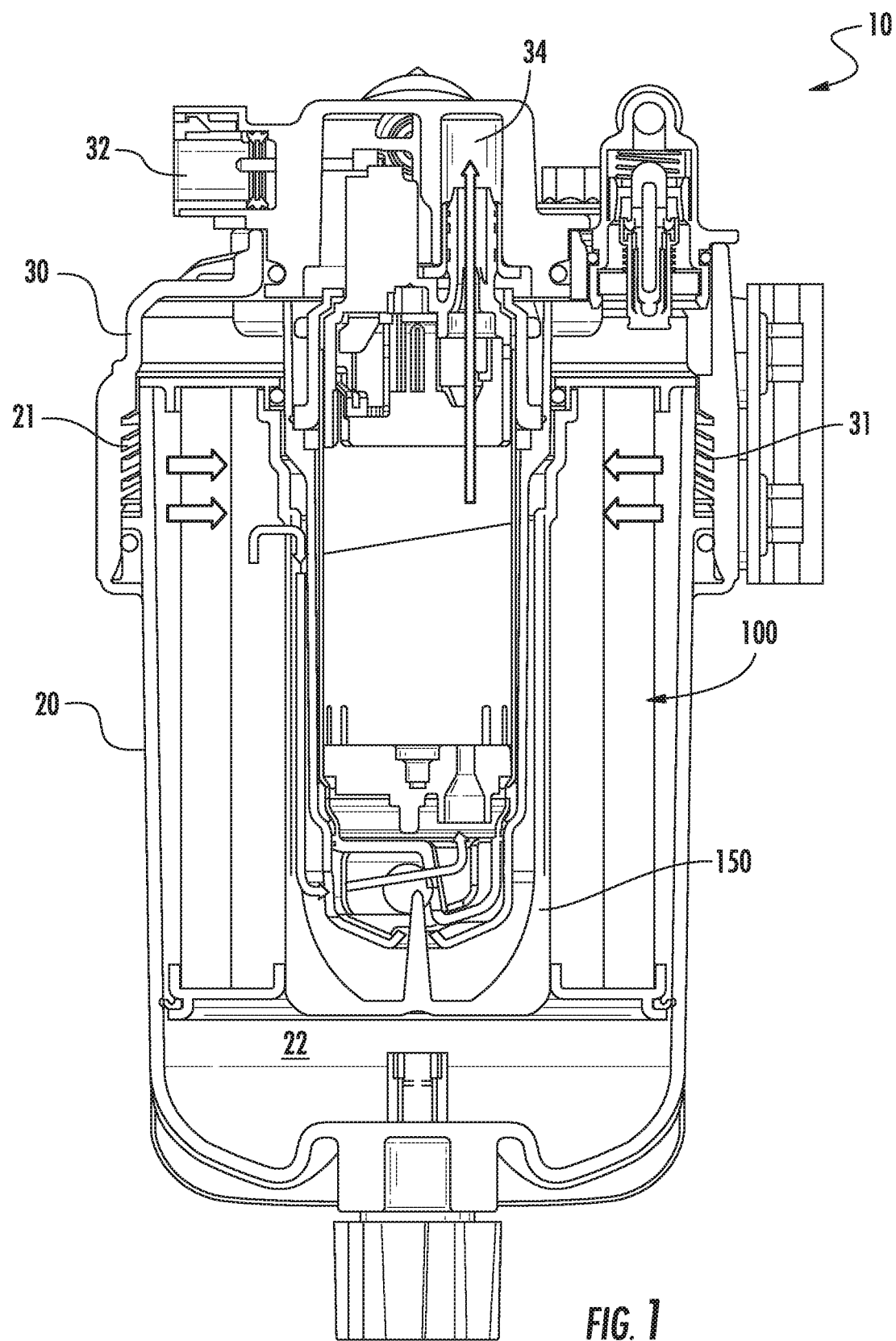
FIG. 1 is a cross-sectional view of a fuel filter assembly having an air management device according to an example embodiment of the present invention.

FIG. 1 shows a filter assembly 10 having a self-adjusting air management device according to an example embodiment. The filter assembly 10 generally includes a housing or shell 20 having a hollow interior space 22 and a lid or cover 30 that is removably attached to the housing 20 by, for example, external threads 31 that engage with internal threads 21 disposed on a periphery of the housing 20. As further shown in FIG. 1, the filter assembly 10 also includes a filter element or cartridge 100 disposed within the interior space 22 of the housing 20. The lid 30 includes a fluid inlet 32, which receives fluid to be filtered by the filter element 100, and a fluid outlet 34, in which fluid exits the filter assembly 10 after the fluid has been filtered by the filter element 100.

In the example embodiment shown, the filter assembly 10 is configured to filter a fuel. However, in other embodiments, the filter assembly 10 may be used to filter other types of fluid, such as oil, lube, or the like. In addition, in the example embodiment shown, the filter assembly 10 is positioned upstream of an electric fuel pump (not shown) such that filter fluid exiting the filter assembly 10 through the fluid outlet 34 is received into the fuel pump. The filter assembly 10, however, is not necessarily limited to the use of an electric fuel pump. For example, the filter assembly 10 may be used without a pump or may be used in conjunction with non-electric pumps.

Figure 2:
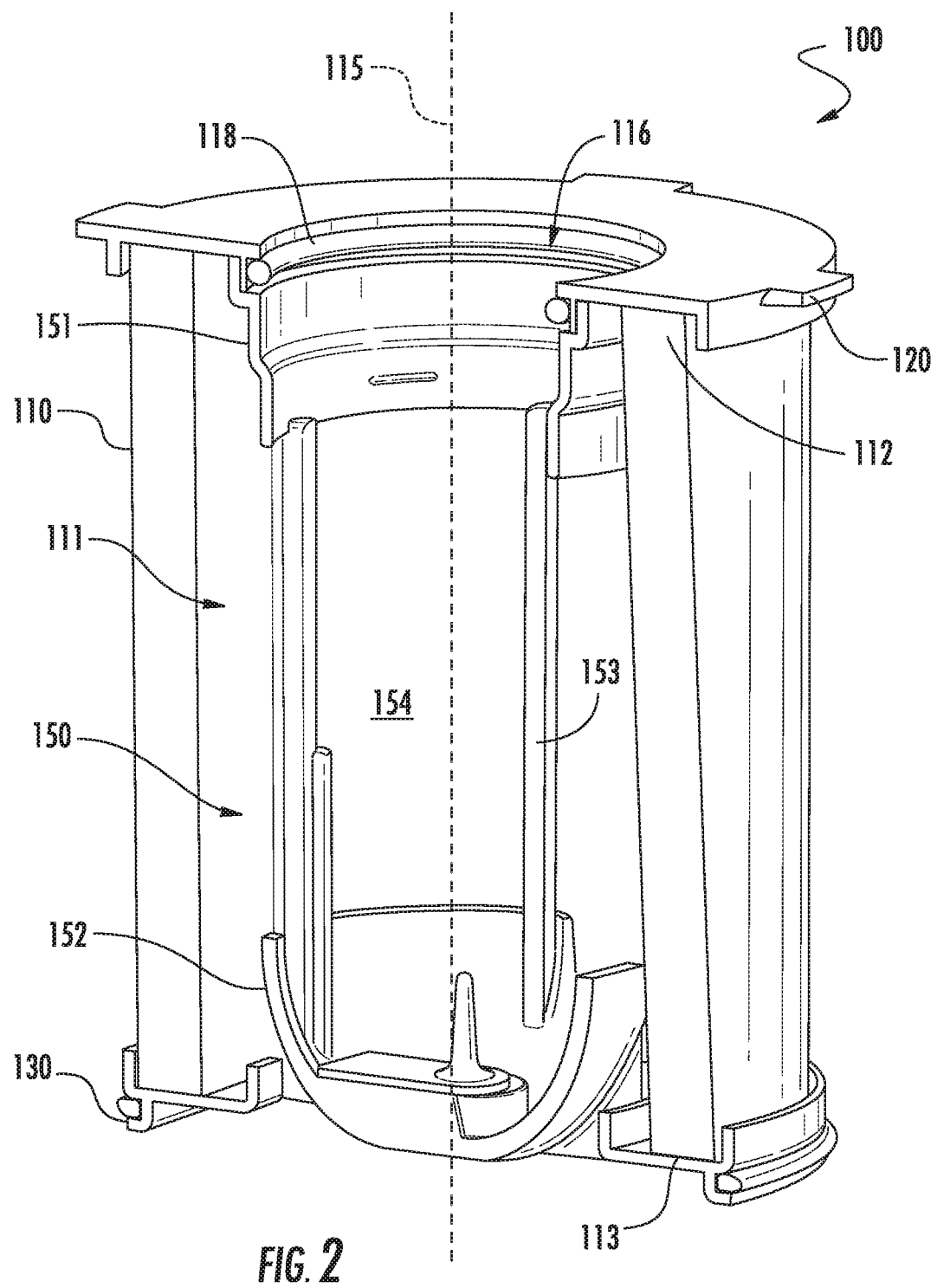
FIG. 2 is a cross-sectional perspective view of a filter element for the filter assembly of FIG. 1.

As shown in FIG. 2, the filter element 100 includes a filter media 110, a first end cap 120 attached to a first end 112 of the filter media 110, and a second end cap 130 attached to a second end 113 of the filter media 110. The filter media 110 is substantially cylindrical in shape and includes an inner annulus 111 that extends along a longitudinal axis 115 of the filter element 100. In some embodiments, the filter media 110 may be a pleated filter media, which includes a plurality of pleats 115 extending along the longitudinal axis of the filter media 110. However, the filter media 110 is not limited to a pleated configuration and may, alternatively, comprise other configurations of filter media.

As further shown in FIG. 2, an air management device 150 is disposed within the inner annulus 111 of the filter media 110. The air management device 150 includes a top portion 151 disposed at the first end 112 of the filter media 110, a bottom portion 152 disposed at the second end 113 of the filter media 110, and a plurality of frame members 153 that extend along the longitudinal axis 115 to connect the top portion 151 to the bottom portion 152 to define an inner cavity 154 within the air management device 150. In certain embodiments, the air management device 150 may be a separate component that is disposed and held within the inner annulus 111 by the first end cap 120 and/or the second end cap 130 of the filter element 100. For example, the second end cap 130 may serve as a base on which the bottom portion 152 may sit such that the air management device 150 is held upright within the inner annulus 111. In some embodiments, the air management device 150 may be removably attached (e.g., threaded engagement) to the first end cap 120 and/or the second end cap 130 of the filter element 100. In other embodiments, the air management device 150 may be integrally formed with or permanently attached to the filter element 100 (e.g., the top portion 151 is integrally formed with or permanently attached to the first end cap 120 and/or the bottom portion 152 is integrally formed with or permanently attached to the second end cap 130).

Figure 3:
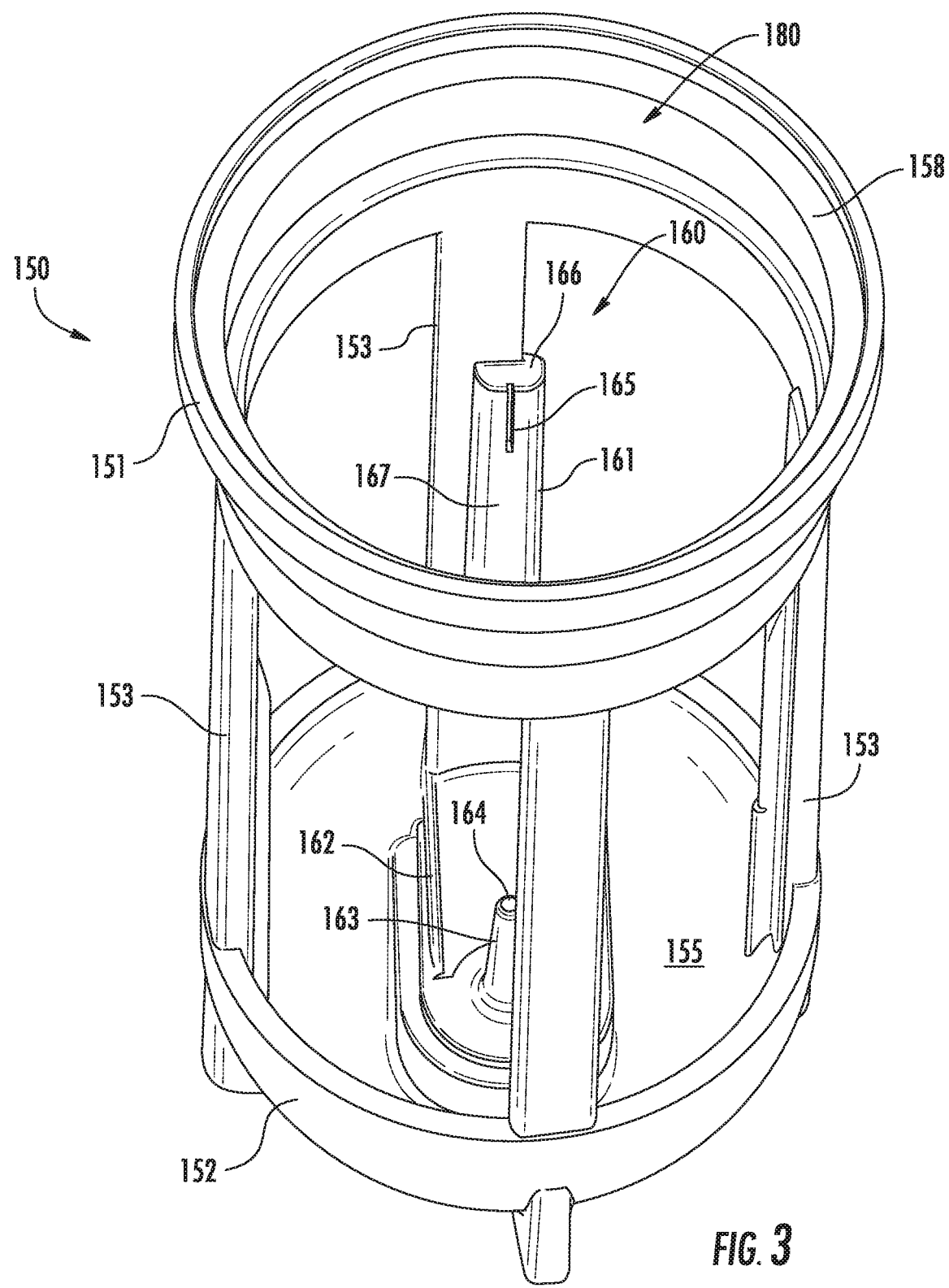
FIG. 3 is a cross-sectional perspective view of the air management device of FIG. 1.

As shown in FIG. 3, the top portion 151 includes an opening 180 that is configured to align with a central opening 116 in the first end cap 120. The opening 180 and the central opening 116 allow the inner cavity 154 of the air management device 150 to be in fluid communication with the fluid outlet 34 of the filter assembly 10. The top portion 151 may further include a rim 158. The rim 158 may be configured to receive a sealing element, such as an O-ring 118, such that when the opening 180 is aligned with the central opening 116, a seal is created between the air management device 150 and the first end cap 120.

As further shown in FIG. 3, the bottom portion 152 is formed as in a bowl-like shape having a closed bottom surface 155. Disposed on the bottom surface 155 is an air management valve 160. The air management valve 160 includes a base portion 162, an intake valve 161, and an exhaust valve 163. As shown in the figure, the base portion 162 is centrally disposed on the bottom surface 155 of the bottom portion 152 from which the intake valve 161 and the exhaust valve 163 extend. At a first end of the base portion 162, the intake valve 161 is provided. At a second end of the base portion 162, which is substantially opposite the first end, the exhaust valve 163 is provided.

The exhaust valve 163 is an elongated protrusion that extends parallel to the longitudinal axis 115 from the base portion 162 towards the top portion 151. An exit orifice 164 is provided at a top end of the exhaust valve 163. In addition, the intake valve 161 is an elongated protrusion that extends parallel to the longitudinal axis 115 from the base portion 162 towards the top portion 151. The intake valve 161 may also longitudinally extend along an inner peripheral surface of the inner cavity 154. For example, the intake valve 161 may longitudinally extend along a frame member 153 (see, e.g., FIG. 4). In addition, as shown in FIG. 3, the intake valve 161 extends further upwards towards the top portion 151 than the exhaust valve 163.

As further shown in FIG. 3, the intake valve 161 includes a top end 166 that is closed or covered. An elongated opening is provided on one side, such as an inward side 167 (the side facing inwardly towards the inner cavity 154), of the intake valve 161. In the example embodiment shown, the elongated opening is a slit 165 having a width that is smaller than its total length. The slit 165 extends downwardly from the top end 166 towards the base portion 162 along a length of the intake valve 161. In certain embodiments, the slit 165 includes a length such that a bottom edge of the slit 165 remains vertically above the exit orifice 164 of the exhaust valve 163 (i.e., the bottom edge of the slit 165 is closer to the top portion 151 than the top end of the exhaust valve 163). The length of the slit 165 is substantially parallel or parallel to the longitudinal axis 115. The slit 165 includes a length and a width such that a cross-sectional area of the slit 165 is large enough to allow for sufficient removal of air from the filter element 100. In certain embodiments, the slit 165 extends downwardly along a length that is less than one-half the total length of the intake valve 161. In other embodiments, the slit 165 extends downwardly along a length that is less than one-third the total length of the intake valve 161.

Figure 4:
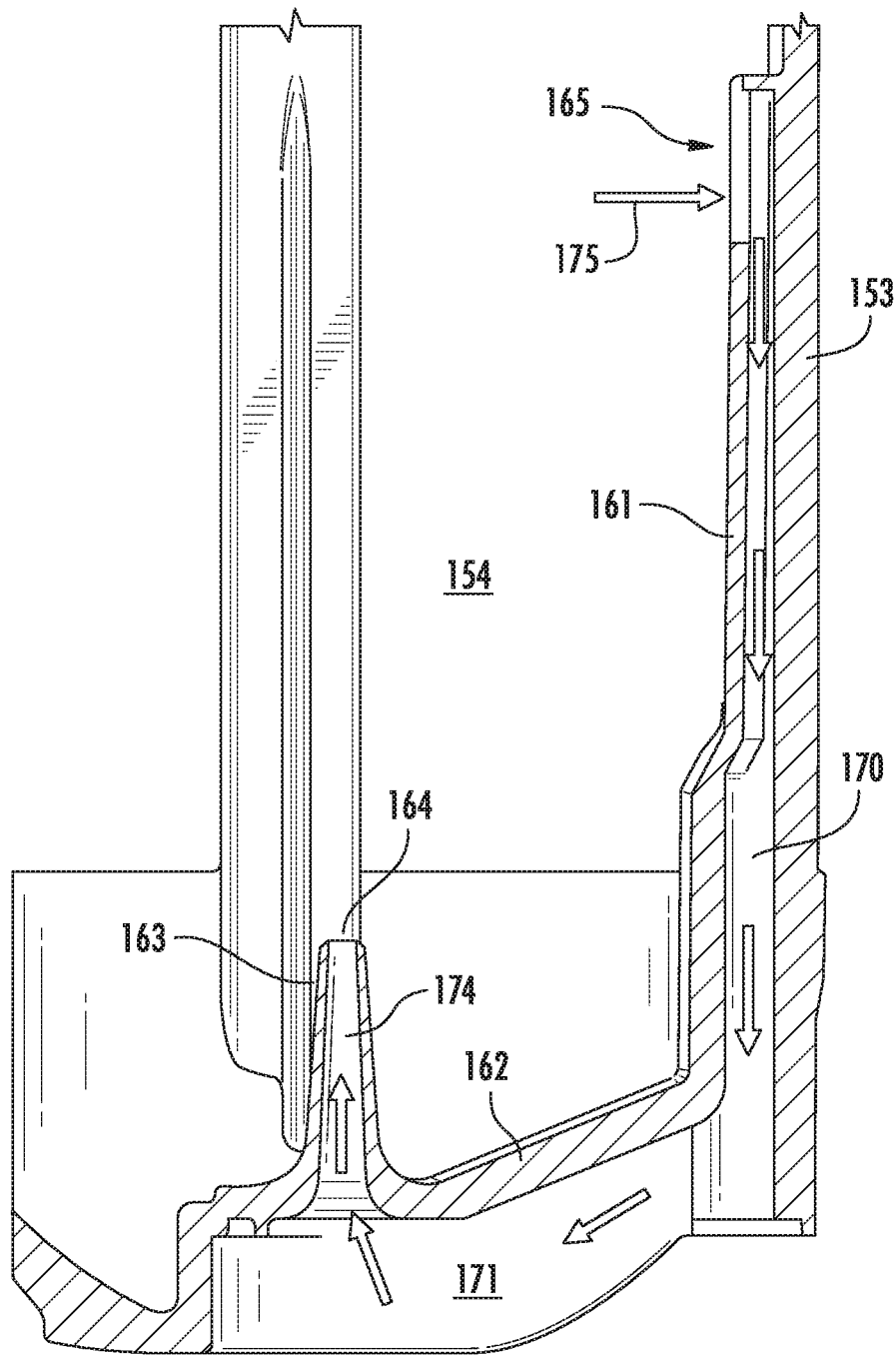
FIG. 4 is a cross-sectional view of a flow path of the air management device of FIG. 3.

FIG. 4 shows a flow path of air and/or fuel through the air management device 150 according to an example embodiment. As shown in the figure, the intake valve 161 includes an intake passage 170 that extends along the length of the intake valve 161. Air and/or fuel enters the intake passage 170 through the slit 165 and flows downward toward a central cavity 171 provided in the base portion 162 as shown by the arrows 175. The air and/or fuel then flows from the central cavity 171 through an exit passage 174, where the air and/or fuel exits the exhaust valve 163 through the exit orifice 164 and is reintroduced into the inner cavity 154 of the air management device 150.

As described above, the air management device 150 is configured to passively control the amount of air that enters the intake valve 161 for controlled management and extraction of the air present within the inner cavity 154. By providing a slit 165 in the intake valve 161, a single diameter metering device is converted into a varying diameter metering device. For example, when the fluid or liquid level of the filtered fuel within the inner cavity 154 rises such that the length of the slit 165 remaining exposed is shortened, the amount of air entering the intake valve 161 is reduced. Such variation in air intake through the intake valve 161 allows for variable air metering provided to the filtered fuel that is self-adjusting based upon the air and fuel levels present in the filter element 100, thus improving the air management of the filter assembly 10.

In addition, the slit 165 allows air to be mixed into the fuel as the mixture enters the intake passage 170 such that when the air-fuel mixture exits the exit orifice 164, the air contained within the fuel is present in smaller bubbles, resulting in a higher "quality" of air drawn through the intake valve 161 and a more uniform air flow reintroduced into the inner cavity 154. This reduction in bubble size helps prevent cavitation in a fuel pump present downstream of the fluid assembly outlet, thus reducing noise, both in terms of sound pressure level (i.e., SPL in dB) and in sound quality (i.e., amplitude of the sound pulsations). For example, at low load levels (e.g., load levels at about 10 kPa restriction), overall noise in the fuel pump may be reduced by about 2 dBA. In addition, at high load levels (e.g., load levels at about 24 kPa restriction), sound quality is greatly improved through significant reduction in the amplitude of sound pulsations, resulting in a more "even" sound noise over time.

The term "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, various parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various example embodiments without departing from the scope of the concepts presented herein.

What is claimed is:

1. A filter element, comprising:
   a filter media having a first end and a second end and defining an inner annulus;
   a first end cap attached to the first end of the filter media; and
   an air management device disposed within the inner annulus, the air management device including:
      a top portion disposed at the first end of the filter media;
      a bottom portion disposed at the second end of the filter media;
      a plurality of frame members extending longitudinally and connecting the top portion to the bottom portion so as to define an inner cavity located within the inner annulus; and
      an air management valve including:
         a base portion provided at the bottom portion;
         an intake valve extending from the base portion toward the top portion, the intake valve including an elongated opening that extends along a portion of a length of the intake valve;
         an exhaust valve extending axially from the base portion toward the top portion into the inner cavity, the exhaust valve extending along a longitudinal axis of the filter element; and
         a fluid passage extending from the intake valve to the exhaust valve such that air and/or fuel enters into the intake valve through the elongated opening, flows through the fluid passage within the air management device from the intake valve directly to the exhaust valve, exits the exhaust valve, and is reintroduced into the inner cavity, and
         wherein an amount of air introduced through the elongated opening varies based on a fluid level present within the filter element.

2. The filter element of claim 1, wherein the elongated opening extends from a top end of the intake valve towards the base portion.

3. The filter element of claim 1, wherein the elongated opening extends parallel to the longitudinal axis of the filter element.

4. The filter element of claim 3, wherein the elongated opening is a slit, and a length of the slit extends parallel to the longitudinal axis.

5. The filter element of claim 4, wherein the length of the slit is one-half the length of the intake valve.

6. The filter element of claim 4, wherein the length of the slit is one-third the length of the intake valve.

7. The filter element of claim 1, wherein a top end of the intake valve is closed.

8. The filter element of claim 1, wherein the elongated opening is provided on a side facing inwardly toward the inner cavity defined by the top portion and the bottom portion.

9. The filter element of claim 1, wherein the intake valve extends further towards the top portion than the exhaust valve.

10. The filter element of claim 1, wherein the filter element is a fuel filter element.

11. The filter element of claim 1, wherein the first end cap includes a central opening and the top portion includes an opening configured to align with the central opening.

12. The filter element of claim 11, wherein the top portion further includes a rim and a sealing element received within the rim such that, when the opening aligns with the central opening, a seal is created between the air management device and the first end cap.

13. The filter element of claim 1, further comprising a second end cap attached to the second end of the filter media, wherein the second end cap serves as a base on which the bottom portion sits such that the air management device is held upright within the inner annulus.

14. The filter element of claim 1, wherein the air management device is removably attached to the filter element.

15. The filter element of claim 1, wherein the air management device is permanently attached to the filter element.

16. The filter element of claim 1, wherein the fluid passage includes a central cavity.

17. The filter element of claim 1, wherein the fluid passage is enclosed and is continuous from the intake valve to the exhaust valve.

* * * * *